Sept. 13, 1938.  K. D. LOOSE ET AL  2,130,097
DOUGH LAPPING MACHINE
Filed March 1, 1937  13 Sheets-Sheet 1
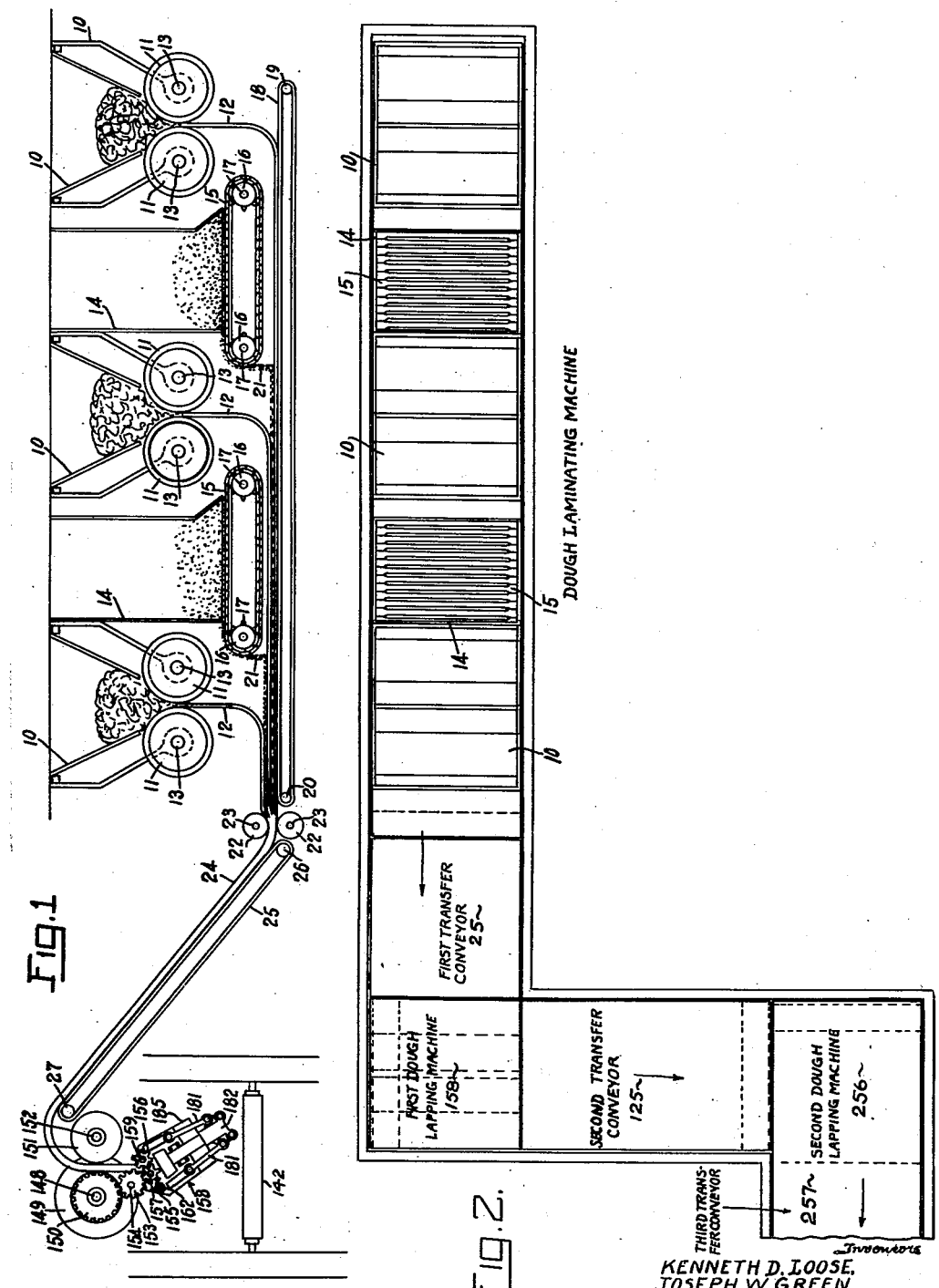
KENNETH D. LOOSE,
JOSEPH W. GREEN,
CHARLES W. WATKINS,

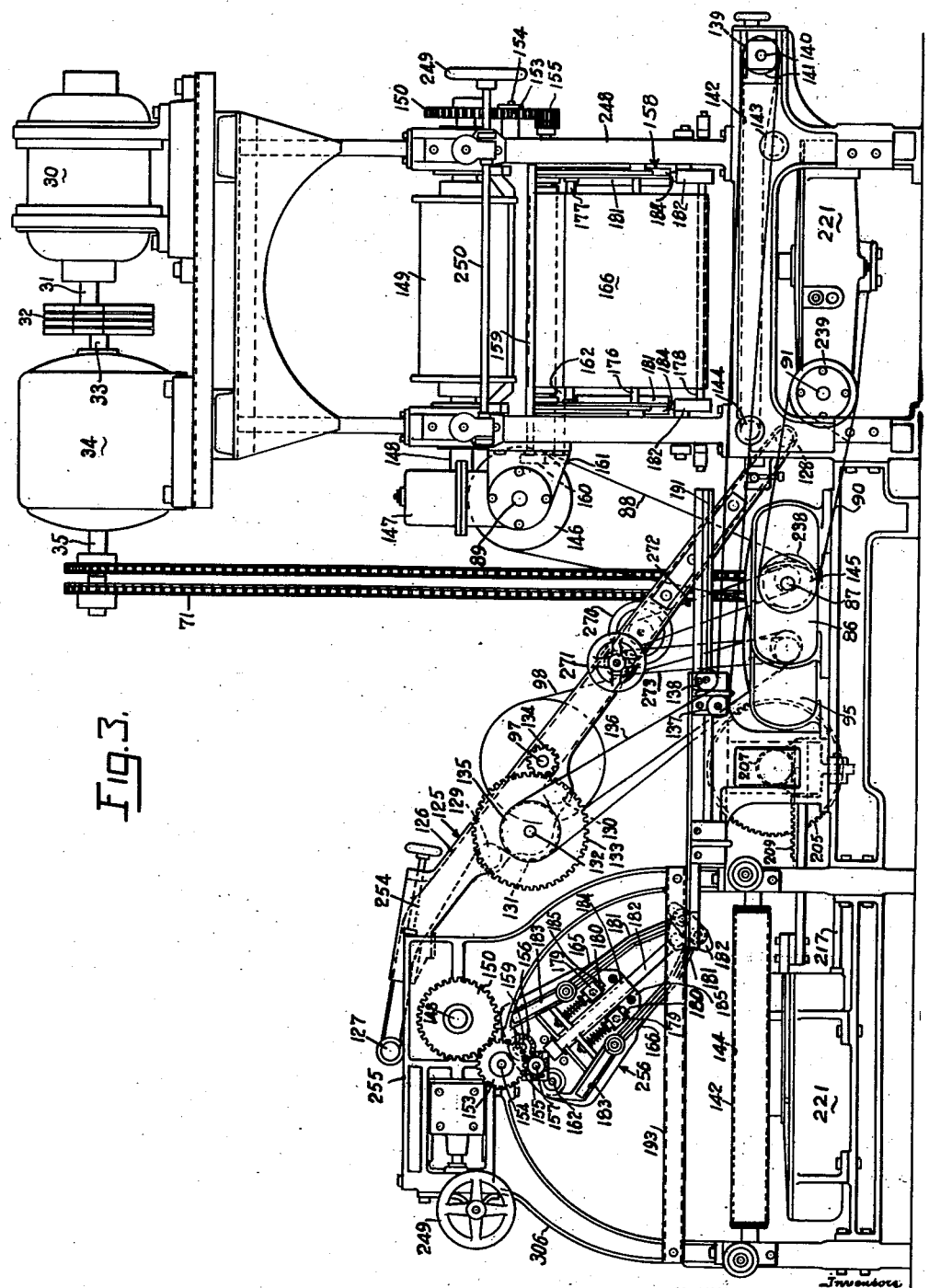

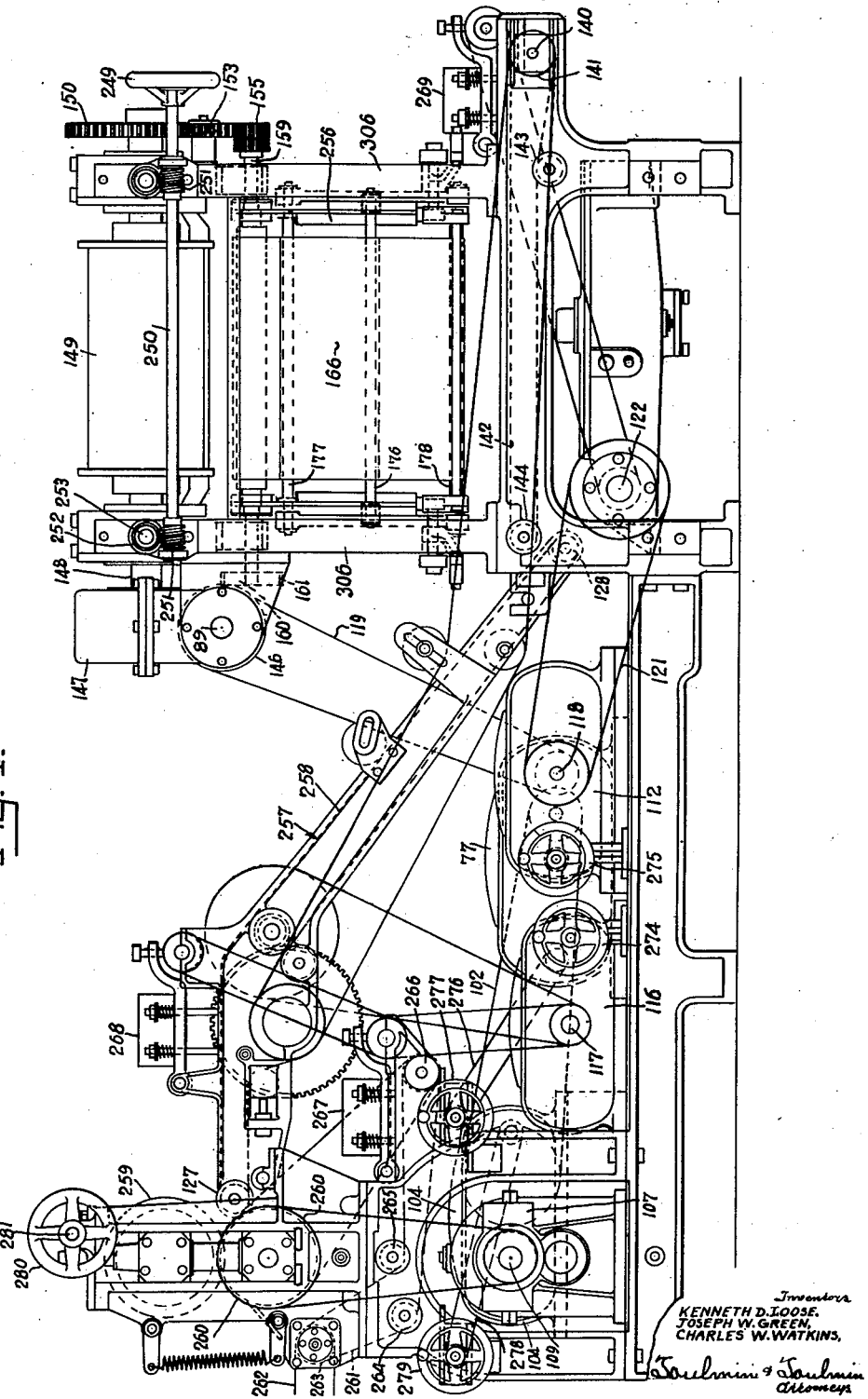

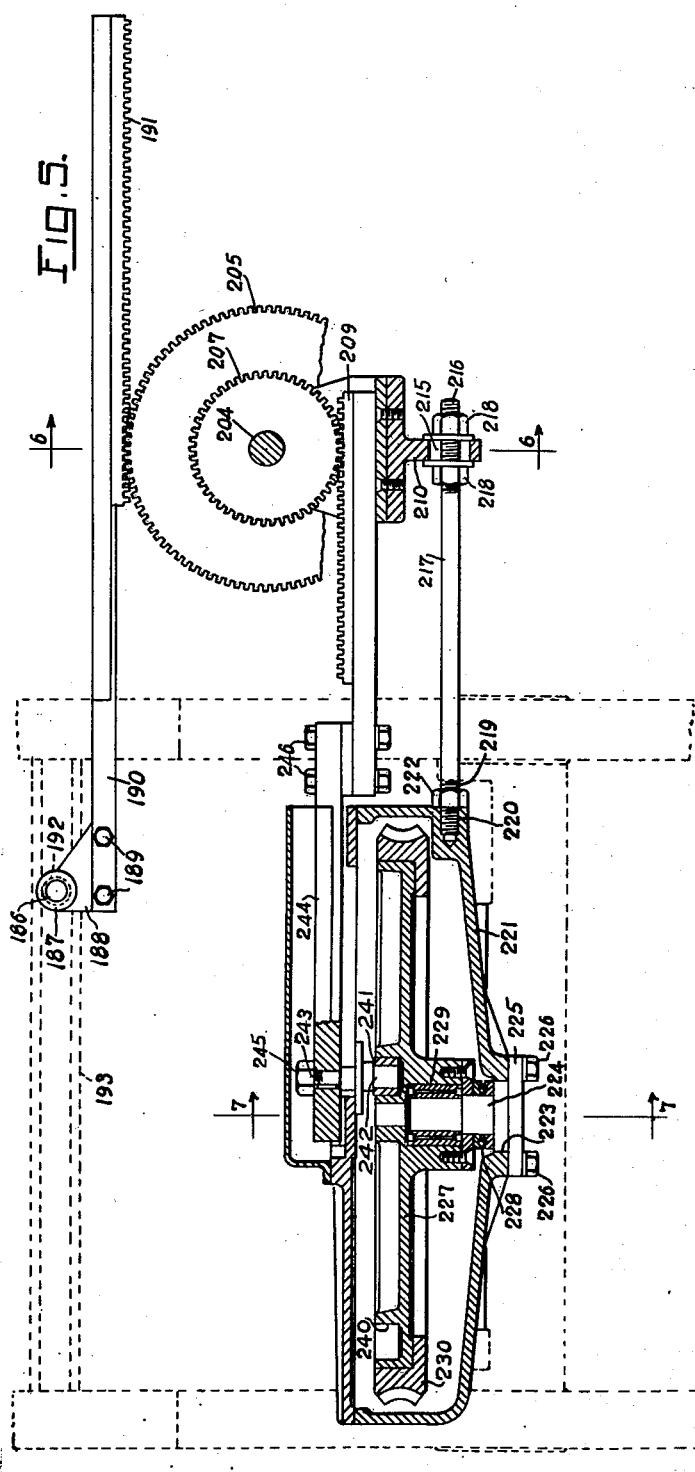

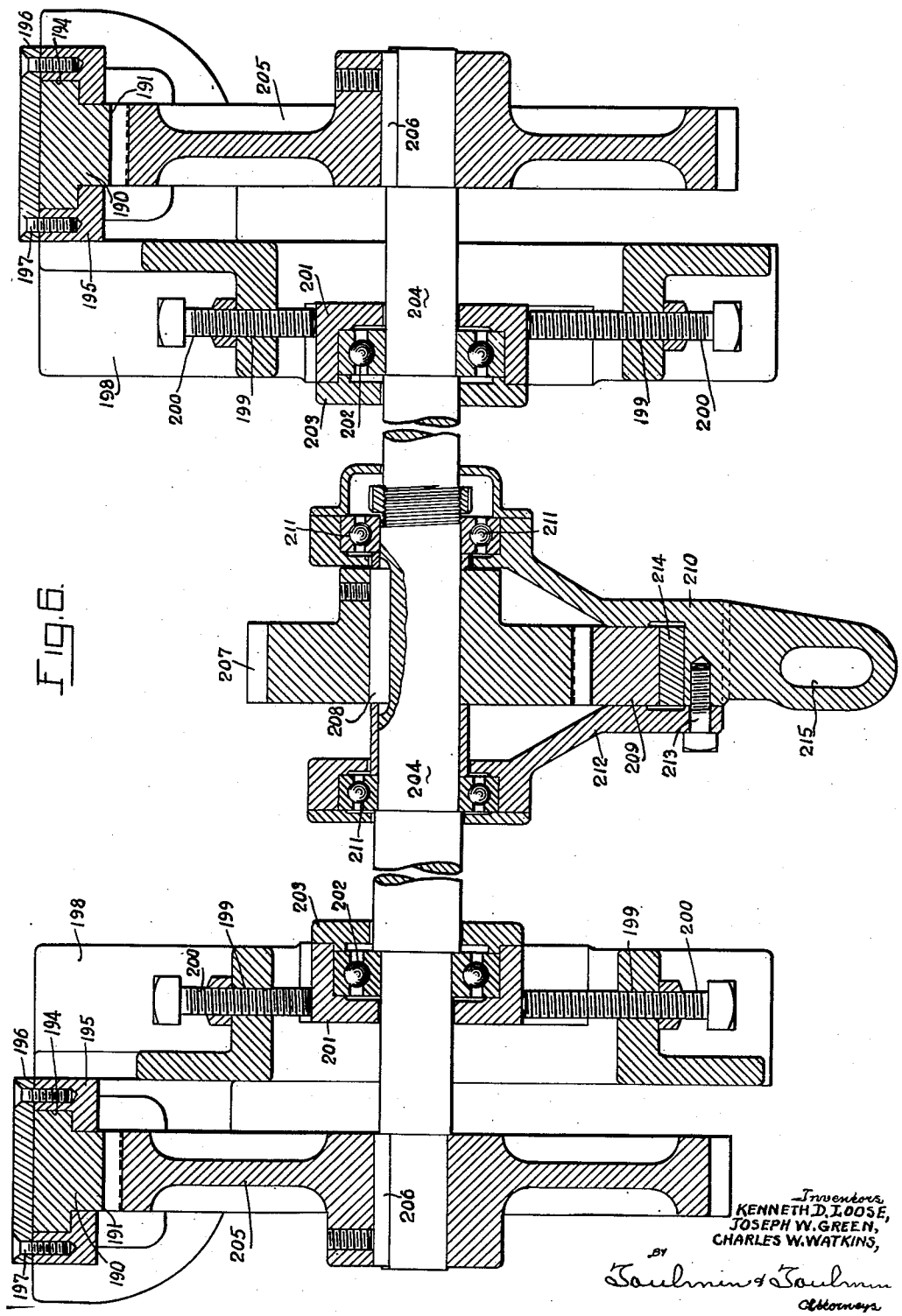

Sept. 13, 1938. K. D. LOOSE ET AL 2,130,097
DOUGH LAPPING MACHINE
Filed March 1, 1937 13 Sheets-Sheet 6
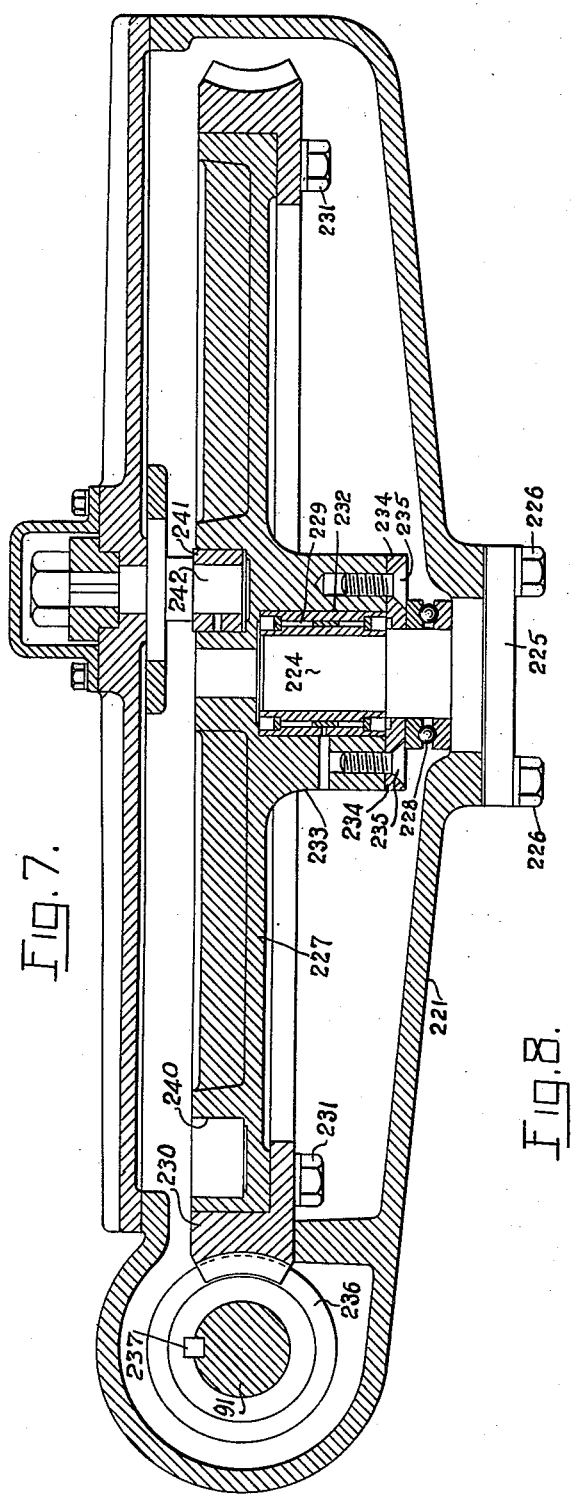
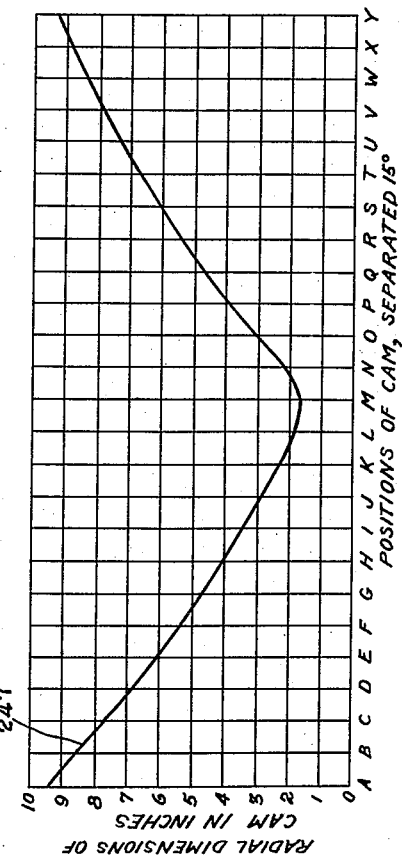
INVENTORS
KENNETH D. LOOSE,
JOSEPH W. GREEN,
CHARLES W. WATKINS,
BY
Toulmin & Toulmin
Attorneys Sept. 13, 1938.   K. D. LOOSE ET AL   2,130,097
DOUGH LAPPING MACHINE
Filed March 1, 1937     13 Sheets-Sheet 7

VARYING ANGULARITY OF
LAPPER THROUGH EQUAL
TIME PERIODS

Inventors
KENNETH D. LOOSE,
JOSEPH W. GREEN,
CHARLES W. WATKINS,
BY Toulmin & Toulmin
Attorneys Sept. 13, 1938. K. D. LOOSE ET AL 2,130,097
DOUGH LAPPING MACHINE
Filed March 1, 1937 13 Sheets-Sheet 8
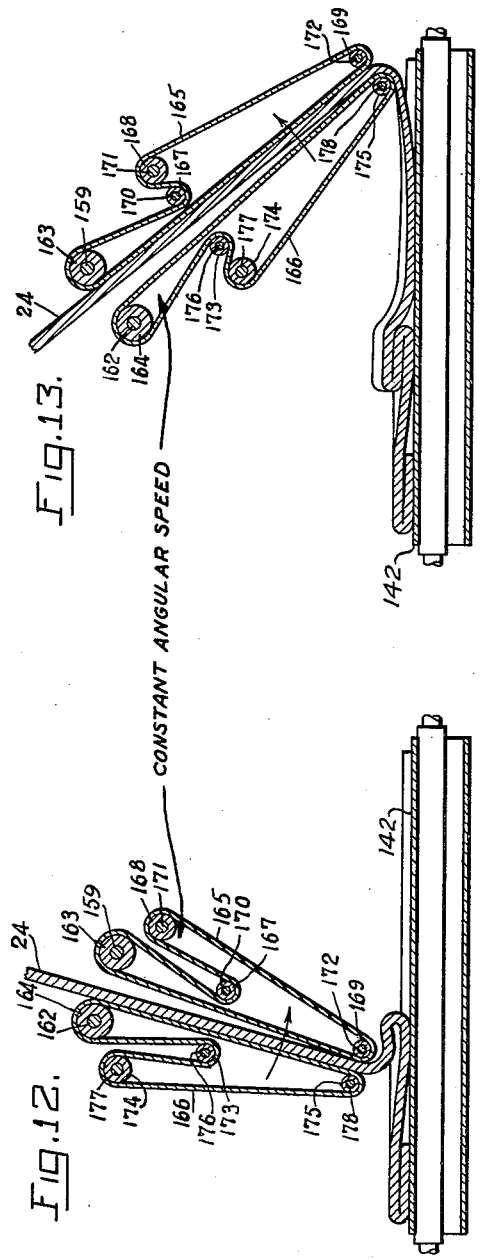
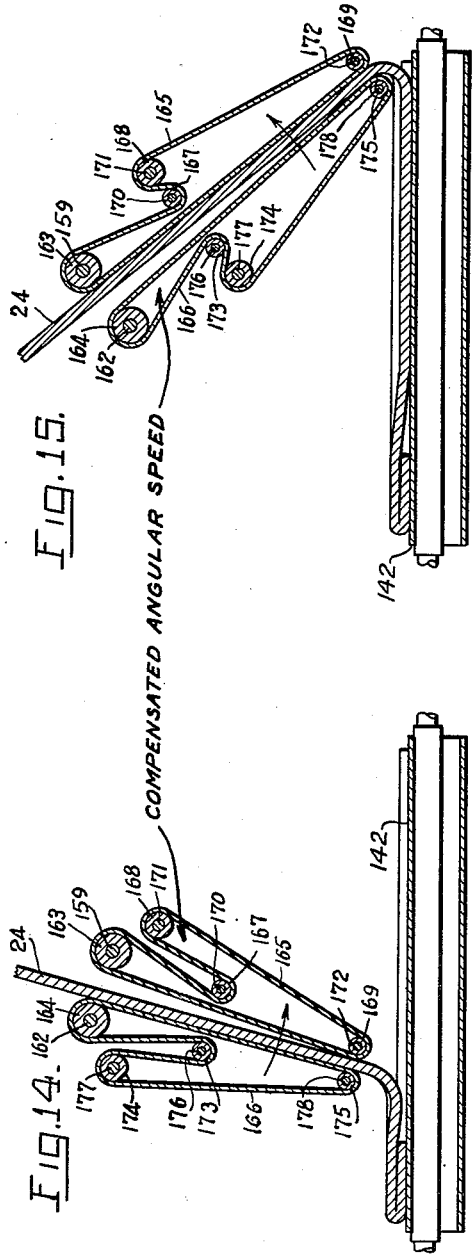
INVENTORS
KENNETH D. LOOSE,
JOSEPH W. GREEN,
BY CHARLES W. WATKINS,
Toulmin & Toulmin
ATTORNEYS Sept. 13, 1938.  K. D. LOOSE ET AL  2,130,097
DOUGH LAPPING MACHINE
Filed March 1, 1937  13 Sheets-Sheet 9

Inventors
KENNETH D. LOOSE,
JOSEPH W. GREEN,
CHARLES W. WATKINS,
BY
Toulmin & Toulmin
Attorneys Sept. 13, 1938.　　K. D. LOOSE ET AL　　2,130,097

DOUGH LAPPING MACHINE

Filed March 1, 1937　　13 Sheets-Sheet 10

INVENTORS
KENNETH D. LOOSE,
JOSEPH W. GREEN,
CHARLES W. WATKINS,
BY
Toulmin & Toulmin
Attorneys Sept. 13, 1938. K. D. LOOSE ET AL 2,130,097

DOUGH LAPPING MACHINE

Filed March 1, 1937 13 Sheets-Sheet 13

Inventors
KENNETH D. LOOSE,
JOSEPH W. GREEN,
CHARLES W. WATKINS,
BY
Toulmin & Toulmin
Attorneys Patented Sept. 13, 1938

2,130,097

UNITED STATES PATENT OFFICE 2,130,097

DOUGH LAPPING MACHINE

Kenneth D. Loose, Bronxville, N. Y., and Charles Wayne Watkins and Joseph W. Green, Dayton, Ohio, assignors to Loose-Wiles Biscuit Company, Long Island City, N. Y., a corporation of New York Application March 1, 1937, Serial No. 128,438

17 Claims. (Cl. 107—1)

This invention pertains to dough-working machinery, and in particular, to lapping machines for lapping and overlapping continuous sheets of dough.

One object of this invention is to provide a dough-lapping machine, wherein the lapping device travels with compensated speed adapted to cause the dough to be delivered from the lapping machine at exactly the proper speed so that it will be laid down upon the receiving conveyor without wrinkling or stretching the dough.

Another object is to provide a dough-lapping machine wherein a continuous sheet of dough is deposited upon a moving conveyor by a lapping device which moves to and fro transversely across the conveyor, compensating devices being provided to vary the speed of the lapping device at different points in its travel so that the sheet of dough will be neither too loose nor too tightly stretched as it is laid down upon the conveyor.

Another object is to provide a dough-lapping machine of the type described above, wherein the dough delivery device of the dough-lapping machine is caused to move more rapidly near the start of its stroke than later in its stroke, thereby preventing either the stretching or the wrinkling of the dough as it is deposited upon the conveyor.

Another object is to provide specific mechanisms for applying a compensating speed to the dough delivery device of the lapping machine so as to prevent such stretching or wrinkling of the dough.

This application is a continuation in part of our copending application, Ser. No. 43,246, filed October 2, 1935, issued April 13, 1937, as Patent No. 2,076,657.

In the drawings:

Figure 1 is a diagrammatic view, partly in vertical section, showing the principal moving parts of the dough-lapping machine of this invention, together with a dough-laminating machine for producing and supplying the continuous sheet of dough to the lapping machine, the speed compensating mechanism being omitted.

Figure 2 is a diagram, in plan view, showing the relative arrangement of the laminating machine of Figure 1, the first lapping machine and the second lapping machine in accordance with this invention.

Figure 3 is a side elevation of the assembly of the first and second lapping machines, with the laminating machine omitted.

Figure 4 is a left-hand end elevation of the lapping machine assembly of Figure 3, showing the subsequent machinery for regulating the thickness of the dough beyond the second lapping machine.

Figure 5 is a view, partly in section, showing the operating cam and associated mechanism for imparting a compensated speed to the dough-delivery device of the lapping machine.

Figure 6 is a vertical section through the gear shaft of the lapping device, taken along the line 6—6 of Figure 5.

Figure 7 is an enlarged vertical section, along the line 7—7 of Figure 5, showing the driving arrangement for the operating cam, giving the compensated speed to the lapping machine.

Figure 8 is a graph showing the relationship of the compensated speed imparted by the cam to the dough-delivery device of the lapping machine, as illustrated by the position of the cam as related to its variable radius.

Figures 12 and 13 are diagrammatic views of a prior-art lapping machine, showing how the dough becomes wrinkled and stretched, respectively, at various portions of the stroke of the machine.

Figures 14 and 15 are diagrammatic views showing the action of the lapping machine of the present invention, having a compensated speed for correctly depositing the dough without stretching or wrinkling.

General arrangement

Figure 9:
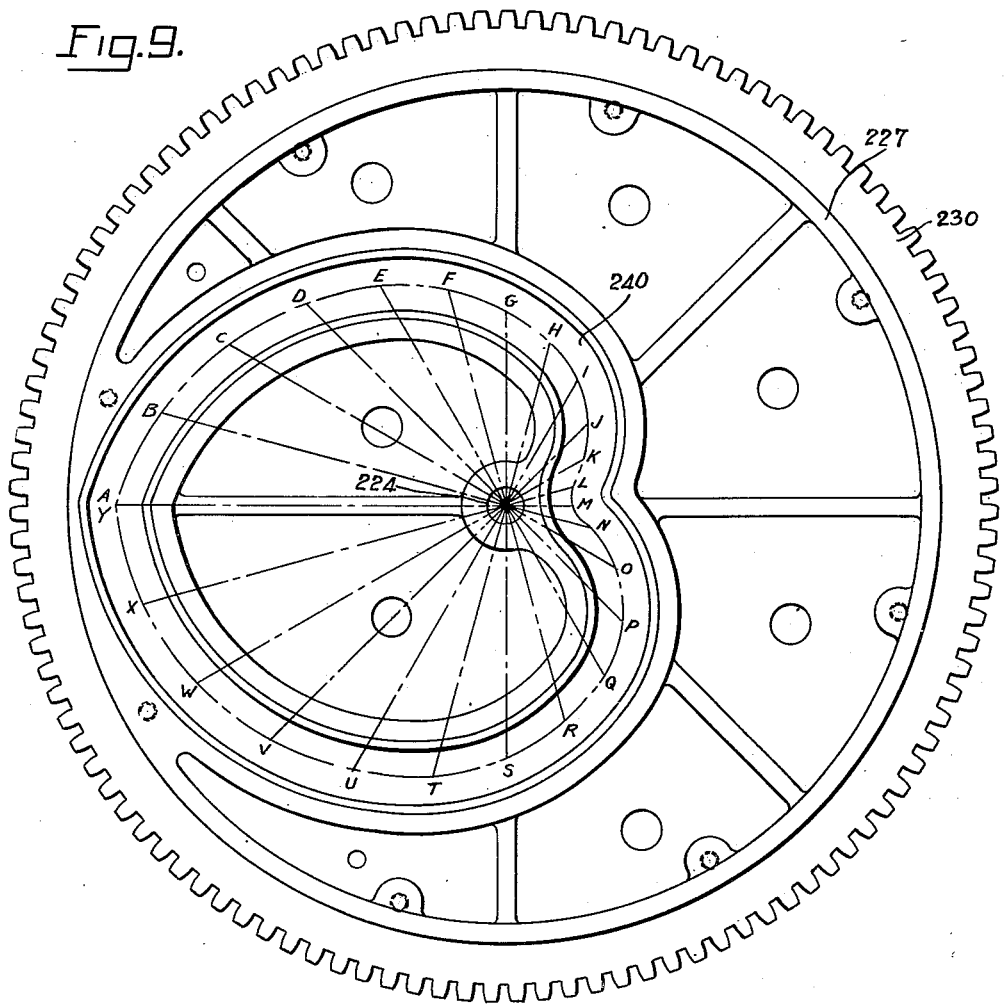
Figure 9 is a top plan view of the cam shown in Figure 7, together with its operating gear.

In general, the machine of the present invention consists of a lapping device which receives a continuous sheet of dough and deposits this sheet upon a transversely moving conveyor while it moves the sheet to and fro across the conveyor as the conveyor itself is moving. This operation results in the lapping and overlapping of the dough sheet upon itself as it moves through the machine. In order to show the place of the lapping machine of this invention and its operation more clearly, however, a diagrammatic showing is made in Figures 1 and 2 of the laminating machine, or machine for producing the continuous sheet of dough. These features also show diagrammatically the other mechanisms ordinarily associated with the lapping machine.

In general, the laminating machine shown at the right of Figure 1 consists of a series of hoppers arranged alternately to contain dough or enriching materials, such as fats, cheese, nuts, etc. The first dough hopper deposits a strip of dough upon a continuously moving conveyor and the first enrichment hopper deposits a layer of enrichment material upon this strip. The second hopper covers this with a second strip of dough. This, in turn, is then covered by a second layer of enrichment, and the final dough hopper covers this second layer of enrichment material with a third strip of dough. The strips thus laminated pass through thinning rollers which give a constant thickness to the combined sheet, after which the sheet is conveyed by an upwardly directed conveyor in an oblique direction to the feeding rolls, which feed the sheet into the lapping machine. As previously stated, the lapping machine deposits the dough upon a conveyor while moving it to and fro so that the dough is lapped and overlapped upon itself as it moves through the machine. The thus overlapped sheet passes through other rollers, known as consolidating rollers, which press it to an even thickness. The sheet is then taken up by another conveyor and transported to a second lapping machine, which brings about another overlapping of the previously overlapped dough sheet. The sheet then passes through another set of consolidating rollers, which again press it into an even thickness, and it again is conveyed upwardly by another conveyor to other machinery, forming no part of the present invention and carrying out further operations which are beyond the scope thereof.

The purpose of this overlapping, together with the previous lamination of the dough, is to distribute the enrichment materials thoroughly throughout the dough with the minimum of working or mixing of the dough. Hitherto, the mixing or working of dough, either by hand or machinery, has detracted from the quality of the baked product. The final sheet obtained from the machine of the present invention thus consists of a sheet of dough containing a large number of thin layers of laminated dough and enrichment material. The laminating portions of this apparatus are described and claimed in our co-pending application, Ser. No. 43,246, filed October 2, 1935. The number of times the dough is overlapped by the lapping device, and consequently the number of layers finally obtained, can be regulated by varying the relative speeds between the lapping device and the conveyor upon which the sheet of dough is deposited. The different dough sheets may also be varied in their characteristics so that, for example, the outer layers may be firm whereas the middle layer may be too rich to be self-supporting to form into an ordinary sheet of dough. By placing the rich layer between the firmer outer layers the rich layer is supported by the firmer layers, and when combined with the layers of enrichment material, the product obtained is superior to that obtained by ordinary processes and apparatus.

In particular, the lapping machine of the present invention enables the dough to be deposited upon the transversely moving conveyor without stretching or wrinkling, and to do this the lapping device is given a compensated speed so that it travels to and fro across the conveyor with different speeds at different portions of its journey. Hitherto, in such lapping devices, it has been found that the dough will be deposited at certain portions of the travel of the lapper in a wrinkled condition (Figure 12), and at other portions it will be stretched (Figure 13). This arises from the fact that at some portions of the travel of the lapper the outlet thereof is moving too slowly for the dough so that the latter is deposited more rapidly than it can be laid down evenly upon the conveyor (Figure 12). At another position, however, the outlet of the lapper is traveling too rapidly for the dough to be evenly laid down, and this results in a stretching of the dough, thereby thinning it beyond its intended thickness (Figure 13). The present invention compensates the speed of the lapper at different portions of its stroke so that it lays down the dough evenly at all portions of its stroke (Figures 14 and 15). This provision eliminates the wrinkles and thin portions which the sheet receives in ordinary dough-lapping machinery, as described in connection with Figures 12 and 13.

Laminating machine

The laminating machine by which the laminated sheet of dough is prepared is shown at the right-hand side of Figure 1 in diagrammatic vertical section, and is also shown in plan view at the right-hand side of Figure 2. The details of this laminating machine form no part of the present invention, and are described in our copending application, Ser. No. 43,246, filed October 2, 1935, which has matured into U. S. Patent No. 2,076,657, dated April 13, 1937, and claimed in a divisional application thereof, Ser. No. 128,439, filed March 1, 1937, and matured into U. S. Pat. No. 2,123,703 on July 12, 1938. The laminating machine is described briefly herein, however, because it clarifies the subsequent treatment of the dough in the lapping machine and subsequent machinery.

The laminating machine (Figure 1) consists of a series of dough hoppers 10 into which the dough is placed. These hoppers at their lower portions are provided with feeding rollers 11, by which the dough is fed downwardly in the form of dough sheets 12. These feeding rollers rotate in opposite directions so that the dough is urged downwardly therebetween. Adjustments are provided for varying the distances between the rollers so as to regulate the thicknesses of the sheets 12. The feeding rollers are mounted upon shafts 13 which are driven by appropriate mechanism, forming no part of the present invention. Arranged in sequence between alternate dough hoppers 10 are enrichment material hoppers 14 having open bottoms, across which move enrichment material feeding conveyors 15. These conveyors 15 consist of endless belts having slats associated therewith, and mounted upon drums 16 on shafts 17. One of these shafts is likewise driven by appropriate mechanism, also forming no part of the present invention. As the conveyor 15 moves beneath the open bottom of the enrichment material hopper 14 it gathers a layer of enrichment material and carries it to a point where the material drops downwardly, as shown in Figure 1.

In the operation of the laminating machine the first dough sheet 12 falls upon the main conveyor 18, supported upon the rollers 19 and 20 at opposite ends of the machine, and is transported to a position beneath the first enrichment material hopper 14, where it receives a layer of enrichment material 21 from the first enrichment conveyor 15. Continuing its journey along the main conveyor 18, the dough sheet with its layer of enrichment material passes beneath the second dough sheet 12, and still further along its receives a second layer of enrichment material 21, and subsequently a second layer of dough 12. The combined thickness of dough comprising the sheet then passes between the consolidating rollers 22 mounted upon the shafts 23, resulting in a laminated dough sheet 24 of even thickness. The consolidating roller shafts 23 are also driven by mechanism forming no part of the present invention. The laminated dough sheet 24 then is transported upwardly upon the transfer conveyor 25, mounted upon the transfer conveyor rollers 26 and 27. This transfer conveyor 25 consists of an endless belt by which the dough sheet 24 is transported upwardly on an inclined path, at the top of which it is deposited upon the feeding mechanism associated with the first lapping machine. This feeding mechanism will be described in detail subsequently.

Main driving mechanism

Figure 16:
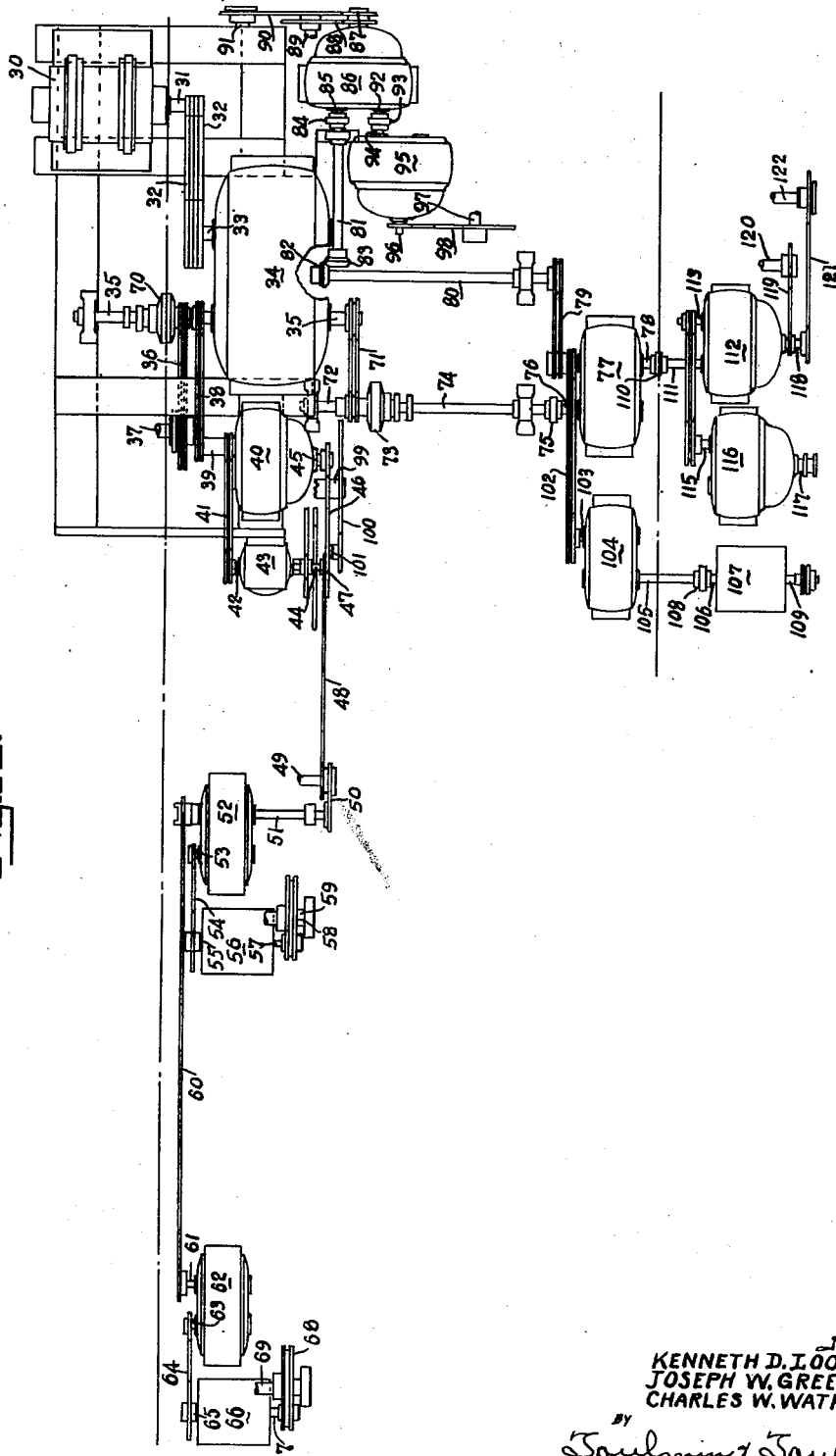
Figure 16 is a top plan view, in diagrammatic layout, showing the driving circuit for the various portions of the laminating and lapping machines of Figure 2.

The main driving mechanism of the machine forms no part of the present invention, but is described briefly and shown in Figure 16 in order to give a clearer idea of the relationship of the two doughlapping machines and the laminating machine employed in the assembly of apparatus in which our invention has been used. The main driving mechanism is shown diagrammatically in Figure 16. This figure serves to explain the interconnection of the various portions of the assembly of machines and apparatus, and their relationship in the production of the improved dough sheet.

The drive starts from the main driving motor 30, seen at the upper right-hand corner of Figure 16, the main shaft 31 of which actuates the belt drive 32 which drives the input shaft 33 of the variable speed transmission 34. This variable speed transmission is of any suitable type, such as the type employing parallel shafts with cone pulleys having adjustable, separable pulley halves. By the separation of these halves the belt running between them may be caused to engage different diameters upon the respective pairs of pulley halves, thereby resulting in a different speed ratio when these diameters are changed by moving the halves apart or closer together, respectively. Such variable speed transmissions are well known in the art, and form no part of the present invention.

The output shaft 35 of the variable speed transmission 34 has a driving connection 36, consisting of a sprocket or belt drive with the laminating machine roller drive shaft 37. The shaft 37 runs horizontally along the laminating machine shown in Figure 1, and by suitable worms and worm gears drives the shafts 13 having the feeding rollers 11 mounted thereon. The driving connection 38 from the same shaft 35 drives the input shaft 39 of the variable speed transmission 40, from which a driving connection 41 drives the input shaft 42 of the variable speed transmission 43, the output shaft 44 of which drives the consolidating roller shafts 23 (Figure 1). The output shaft 45 of the variable speed transmission 40, however, actuates through the driving connection 46 the pulley or sprocket 47, mounted to rotate loosely upon the output shaft 44 of the variable speed transmission 43.

The driving connection 48, such as a belt or sprocket, drives the shaft 49. The shaft 49 drives one of the rollers 19 or 20, by which the main conveyor 18 of the laminating machine is operated (Figure 1). From the shaft 49 the driving connection 50 drives the input shaft 51 of the variable speed transmission 52. The output shaft 53 of the variable speed transmission 52, by the belt or sprocket chain 54, drives the input shaft 55 of the reduction gear 56, the output shaft 57 of which operates the driving connection 58 to the shaft 59, operating one of the shafts 17, which drives the second enrichment material conveyor 15 shown in Figure 1. A driving connection 60 from the opposite end of the input shaft 51 of the variable speed transmission 52 drives the input shaft 61 of the variable speed transmission 62, the output shaft 63 of which operates the driving connection 64, which drives the input shaft 65 of the reduced gear box 66, the output shaft 67 of which operates the driving connection 68 for driving the shaft 69 which conveys power to one of the shafts 17 operating the first enrichment material conveyor 15. A clutch 70 upon the shaft 35 enables the selective operation of portions of the mechanism actuated thereby.

From the output shaft 35 of the first variable speed transmission 34 the driving connection 71 operates the shaft 72, carrying the clutch 73 connecting it with the shaft 74, which is coupled, as at 75, to the input shaft 76 of the variable speed transmission 77. The output shaft 78 of the variable speed transmission 77 operates the driving connection 79 to drive the shaft 80, which in turn, drives the shaft 81 through the bevel gears 82 and 83. The shaft 81 at the coupling 84 joins the input shaft 85 of the variable speed transmission 86, the output shaft 87 of which operates the driving connection 88 which drives the shaft 89 operating the feeding rollers of the first lapping machine. The first lapping machine rollers and their associated mechanism will be described subsequently in more detail. From the output shaft 87 of the variable speed transmission 86 the driving connection 90 leads to the shaft 91 operating the actuating cam of the first lapping machine. This mechanism will likewise be described subsequently in detail.

The second output shaft 92 of the variable speed transmission 86, through the coupling 93, drives the input shaft 94 of the variable speed transmission 95, the output shaft 96 of which operates the first lapping machine transfer conveyor shaft 97 through the driving connection 98. This transfer conveyor is similar in purpose to the transfer conveyor 25 between the laminating machine and the first lapping machine. The transfer conveyor 25 is operated from the output shaft 45 of the variable speed transmission 40 through the intermediate action of the driving connection 46, the shaft 99, the driving connection 100 and the shaft 101.

The output shaft 78 of the variable speed transmission 77 also operates the driving connection 102, which in turn, drives the input shaft 103 of the variable speed transmission 104. The output shaft 105 of the latter operates the input shaft 106 of the reduction gear box 107 through the coupling 108, the output shaft 109 thereof serving to transmit power to the final set of rolls at the extreme end of the machine, and serving finally to gauge the thickness of the finished sheet. The output shaft 78, through the coupling 110, drives the input shaft 111 of the variable speed transmission 112, the output shaft 113 of which operates the driving connection 114 to the input shaft 115 of the variable speed transmission 116, the output shaft 117 of which operates a flour-distributing mechanism for dusting the finished sheet with flour immediately before it is subjected to the operation of the rolls rotated by the shaft 109.

The second output shaft 118 of the variable speed transmission 112 operates the driving connection 119, which rotates the shaft 120. The latter operates the feeding rolls of the second lapping machine, which in turn, operate the oscillating mechanism for the lapping device, in a manner subsequently to be described. The second output shaft of the variable speed transmission 112 also operates the driving connection 121 to drive the shaft 122. This shaft 122 operates the actuating cam of the second lapping machine, in a manner similar to the operation of the first lapping machine cam by the shaft 91. In the manner above described the entire assembly of machines for laminating the sheet, transporting it, gauging it or reducing it to the proper thickness and twice lapping it is driven from the main driving motor 30.

First dough-lapping machine

The first and second dough-lapping machines are of similar construction and with similar principles of operation, hence, similar reference numerals are employed for similar parts. A single description also suffices for the main portions of these two machines. Figure 2 shows the arrangement of the first and second lapping machines with reference to the laminating machine. The progress of the dough, shown in Figure 1, however, is indicated merely to the point where it enters the first lapping machine. The side elevation of the second lapper shown at the left-hand side of Figure 3 is generally similar to that of the first lapper shown in end elevation at the right-hand side of Figure 3.

The second transfer conveyor 125 consists of a belt 126 which passes over rollers 127 and 128 (Figure 3) at the opposite ends of its course. The belt 126 passes over idler rollers 129 and 130, and over the driving roller 131 on the shaft 132, carrying the gear 133 which meshes with the pinion 134 on the first lapping machine transfer conveyor shaft 97, previously mentioned. Consequently, when the shaft 97 is rotated, in the manner previously described, the belt 126 is caused to move in a circuitous path over its various rollers 127, 128, 129, 130 and 131. Mounted on the shaft 132 is a sprocket 135 which drives a sprocket chain 136. The latter passes over idler sprockets 137 and 138 and terminates in a sprocket 139 upon a shaft 140. Mounted on this shaft 140 is a roller 141, over which passes a conveyor belt 142. The latter passes over the idler rollers 143 and 144 at other portions of its course. Consequently, the rotation of the transfer conveyor drive shaft 97 (Figure 3) also causes the conveyor belt 142 to move in a circuitous path around its rollers 141, 143 and 144.

The output shaft 87 of the variable speed transmission 86 carries the sprocket 145 which drives the sprocket chain 88 conveying power to the sprocket 146 upon the shaft 89. This shaft serves as the input shaft of the reduction gear box 147, the output shaft 148 of which carries the feed roll 149 and also the gear 150 (Figures 1 and 3). The feed roll 151 (Figure 1), mounted upon the shaft 152, is driven from the shaft 148 by intermeshing gears (not shown). In this manner the driving of the shaft 89 by the sprocket chain 88 from the variable speed transmission 86 causes the feed rolls 149 and 151 to rotate toward one another, in the manner shown in Figure 1, feeding the dough sheet 24 downwardly into the lapping mechanism. The gear 150 meshes with an idler gear 153 upon the shaft 154 (Figures 1 and 3), this in turn, meshing with the pinion 155 which meshes with and drives the pinion 156. The pinion 155 is mounted upon the pivot shaft 157 of the lapper, generally designated 158, whereas the pinion 156 is similarly mounted upon the shaft 159.

The shaft 159 at its opposite end carries a gear 160 meshing with a similar gear 161 on the end of a shaft 162. The shafts 159 and 162 (Figure 14) are provided with driving rollers 163 and 164 for driving endless belts 165 and 166, respectively. The endless belt 165 passes around the rollers 167, 168 and 169 upon the shafts 170, 171 and 172, respectively, whereas the endless belt 166 similarly passes around the rollers 173, 174 and 175 mounted upon the shafts 176, 177 and 178, respectively. The shafts 170 and 176 are journalled in the bearing blocks 179, which are adjusted to and fro within the rectangular apertures 180 to tighten or loosen the lapper belts. The shafts 171 and 177 are journalled in the upper ends of the connecting rods 181, the lower ends of which are pivotally mounted upon the slidable members 182. The upper ends of the connecting rods 181 reciprocate in rectangular guideways 183, whereas the slidable members 182 are adapted to reciprocate within the guideways 184 of the lapper frames 185.

Extending outwardly from the slidable members 182 are shafts 186 (Figure 5) having bearing engagement with the bearing bosses 187 of the brackets 188. The latter are secured by the bolts 189 to the rack bars 190 carrying the racks 191. The shafts 186 also carry rollers 192 operating in the guideways 193 to guide the nose portion of the lapper in a rectilinear path during its swinging motion. The rack bars 190 are of T-shaped cross-section (Figure 6) and are guided in the T-shaped grooves 194 formed by the side members 195 and top member 196 secured to one another by the screws 197. The guideways thus formed are mounted upon the frame members 198, which are provided with threaded portions 199 carrying adjusting screws 200 engaging the bearing supports 201 for anti-friction bearings 202. The anti-friction bearings 202 are retained in their bearing supports 201 by the cover plates 203 (Figure 6). The inner races of the anti-friction bearings 202 are mounted upon and rotatably support the cross shaft 204, carrying the gears 205 on its opposite ends. These gears 205 are secured to the cross shaft 204 by the keyway shown at 206, and mesh with the racks 191, thereby driving the racks 191 when the cross shaft 204 is oscillated.

The shaft 204, at an intermediate point, carries a gear 207 keyed thereto, as at 208, and meshing with a rack 209 supported by the hanger 210, which in turn, is supported upon the cross shaft 204 by the anti-friction bearings 211. The hanger 210 is provided with a separable portion 212 secured thereto, as at 213, for assembly purposes. A member 214 serves to space the rack bar 209 from the hanger 210 and gives sliding support thereto. The hanger 210 is also provided with an aperture 215 through which passes the threaded end 216 of a tie rod 217 (Figure 5), secured thereto by the nuts 218.

The opposite end of the tie rod 217 is threaded, as at 219, into the threaded bore 220 of the cam housing 221 and secured thereto by the nut 222. The cam housing 221 is provided with a vertical bore 223 (Figure 5), within which is mounted the vertical stub shaft 224 and secured thereto by the end plate 225 and cap screws 226. The stub shaft 224 serves to rotatably support a cam 227, and carries a thrust bearing 228 and a roller bearing 229 for this purpose. The periphery of the cam 227 is provided with a worm gear portion 230, which is secured to the cam 227 by the cap screws 231 (Figure 7). The roller bearing 229 is contained within a vertical bore 232 in the hub 233 of the cam 227, and is maintained in position by the retaining plate 234 secured thereto by the screws 235.

Meshing with the worm gear portion 230 is a worm 236, keyed as at 237, to the cam shaft 91. The latter, it will be recalled, is driven by the sprocket chain 90 (Figure 16) from the output shaft 87 of the variable speed transmission 86, through the intermediate action of the sprockets 238 and 239, respectively, (Figure 3). The cam 227 is provided with a roughly heart-shaped cam groove 240 (Figures 7 and 9) which is of a special character, hereinafter set forth in detail, and which is engaged by a follower roller 241 mounted upon the stub shaft 242 and secured, as at 243, to the connecting rod 244 by the nut 245. The connecting rod 244 is secured to the rack 209 by the bolts 246 (Figure 5).

As a consequence, when the machine is operated so that the sprocket chains 88 and 90 drive the input shaft 89 and cam shaft 91, respectively, the lapper belts 165 and 166 will be moved in an orbital path, thereby feeding the dough sheet 24 downwardly toward the nose portion of the lapper. Meanwhile, the rotation of the cam 227 will cause the follower roller 241 and shaft 242 to reciprocate, transmitting this reciprocating motion to the rack 209, which in turn, causes the gear 207 to move alternately to and fro on the cross shaft 204. This oscillatory motion of the shaft 204 causes the gears 205 to move forwardly and reversely, thereby transmitting a reciprocating motion to the racks 191 and shafts 186, secured to the nose portion of the lapper. In this manner the nose portion of the lapper is caused to reciprocate while it is guided within the guide members 193.

*Special motion of lapper mechanism*

The lapper mechanism is driven with a variable speed at different portions of its travel, as hitherto mentioned under the description of the general arrangement of the machine. The lapper is caused to move with compensated speed so that it causes the dough to be deposited upon the transversely moving conveyor belt 142 without stretching or wrinkling at various points of its journey. Hitherto, the lappers have been caused to move with uniform speeds so that at some portions of their travel the dough will be deposited upon the conveyor in a wrinkled condition (Figure 12), resulting from the fact that the dough outlet is moving too slowly for the dough. At other portions of its journey, however, the lapper moves at too rapid a speed for the dough so that the latter is stretched, as shown at the right-hand side of Figure 13.

Figure 10:
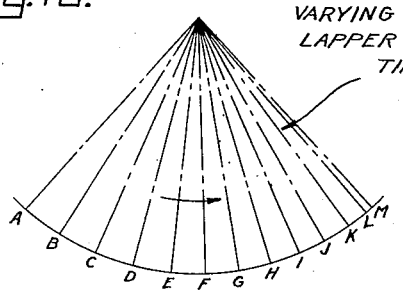
Figures 10 and 11 are diagrammatic representations of the varying speed of the dough-delivery device at different portions of its stroke, corresponding to the different positions of the cam shown in Figure 8.
Figure 11:
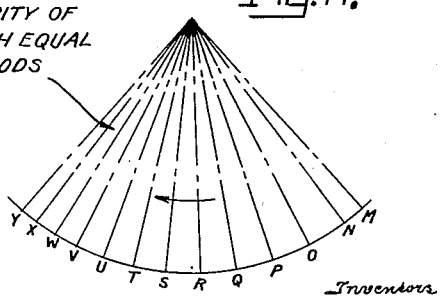

To perform this compensation of the speed of the lapper, the cam groove 240 of the cam 227 is provided with a special configuration such that at the beginning of its stroke the nose portion of the lapper will move more rapidly than hitherto, and subsequently slows down as it nears the end of a half stroke. This slowing down of the lapper as it nears the end of its half stroke (Figure 15) prevents the stretching of the dough which took place in previous machines, as shown in Figure 13, whereas the rapid starting of the dough lapper, as shown in Figure 14, prevented the wrinkling of the dough previously arising as shown in Figure 12. On this return stroke the increasing speed of the lapper prevents the wrinkling of the dough and it slows down to complete its stroke after a rapid travel from its half-way position. This relationship is shown in Figures 10 and 11. Figure 10 shows the position of the lapper for equal time periods indicated by the intervals A, B, C, etc. to M. The return stroke of the lapper takes place from M to Y, as shown in Figure 11. These intervals in Figures 10 and 11 will be equal time periods, hence, Figure 10 shows that the lapper starts its stroke at a rapid speed and slows down as it nears the end of its half stroke. Figure 11, however, shows that the lapper on its return stroke starts out slowly, but increases its speed and thereafter decreases its speed until it arrives at its starting point Y.

Figure 8 shows how the cam is laid out to produce this result. The horizontal portions of the groove (abscissas) represent equal angular intervals in the circumference of the cam, whereas the vertical portions (ordinates) represent the varying radii of the mid-portions of the cam groove 240 at varying locations thereof. The graph curve 247 of Figure 8, while showing the variation of the radius of the cam groove at different portions thereof, indicates indirectly the speed relationship which this cam groove will impart to the lapper. It will be obvious that a uniformly varying speed would be represented by a straight-line descending graph from position A to position M, and by a straight-line ascending graph from position M to position Y. The compensated speed, however, imparted to the lapper causes this graph 247 to be concave upwardly between A and M and convex upwardly between M and Y. In this manner the nose portion of the lapper is given a compensated speed in its reciprocation so that the dough is laid down evenly upon the conveyor belt 142 without wrinkling or stretching.

The first lapper, as shown in Figure 3, is supported upon a frame, generally designated 248. The feed rolls 149 and 151 are moved toward and away from each other by mechanism operated by the hand wheel 249, shaft 250, worms 251 and worm gears 252 upon the adjusting shafts 253 (Figure 4). These worms are shown encased, in Figure 3, for the first lapper but uncovered in Figure 4.

The belt conveyor 125 is mounted upon side members 254, which rest upon the upper frame portion, generally designated 255, of the second lapper (Figure 3). The mechanism of this second lapper is generally similar to that of the first lapper, and its drive has already been described in connection with Figure 16. Accordingly, similar reference numerals are used upon the second lapper for corresponding parts. The cam drive for the lapper nose portion of the second lapper is also similar to that of the first lapper, and provides a similarly compensated speed.

Beyond the second lapper, generally designated 256, the dough passes from the conveyor belt 142 thereof to an upwardly moving transfer conveyor, generally designated 257, having a conveyor belt 258. The drive of the conveyor belt 258 is similar to that of the conveyor belt 126 between the first and second lappers, and passes over similar end rollers 127 and 128. From the end rollers 127 of the transfer conveyor 257 the dough passes between the gauge rolls 259 and 260, where it receives its final thickness-gauging before being deposited upon an intermediate transfer conveyor 261, for transfer to a conveyor 262 leading to other machines, not involved in the present invention. These other machines, for example, may consist of cutting machines or of machines for transporting the dough to the baking ovens. The intermediate transfer conveyor 261 is supported upon the rollers 263, 264, 265 and 266 and is subjected to a flour-dusting operation by the flour-dusting apparatus, generally indicated at 267. Similar flour-dusting apparatus is provided at 268 and 269 for the transfer and belt conveyors shown in Figure 4.

To facilitate the adjustment of the different variable speed transmissions, the controls thereof are connected at remotely located points to hand wheels by means of sprocket chains. In Figure 3 the hand wheels 270 and 271 are connected by the sprocket chains 272 and 273 to the speed adjustments of the variable speed transmissions 86 and 95. In Figure 4 the variable speed transmissions 116 and 112 are adjusted by the hand wheels 274 and 275. The variable speed transmission 77 is adjusted through the sprocket chain 276 by the hand wheel 277. The variable speed transmission 104 is adjusted through the sprocket chain 278 by the hand wheel 279. The gauge rolls 259 and 260 are adjusted as to their separations by manually turning the hand wheel 280 mounted upon the shaft 281.

Operation

The operation of the machine has been sufficiently set forth in connection with the description of the driving mechanism (Figure 16) and in connection with the individual parts previously described. It will, therefore, suffice to summarize the general operation of the machine.

The dough placed in the dough hoppers 10 and the enrichment materials within the hoppers 14 are caused to form the laminated dough sheet 24, as shown in Figure 1, by the action of the various conveyors 18 and 15 and by the consolidating rolls 22. This laminated dough sheet is transported by the belt conveyor 25 to the first lapper, where it passes between the gauge rolls 149 and 151 thereof, into the lapping mechanism, being urged downwardly by the belts 165 and 166 thereof (Figures 14 and 15). The lapper moves to and fro at a compensated angular speed, under the action of the cam drive previously described and shown in Figures 5 to 11, inclusive, so that it deposits the dough sheet in overlapping layers upon the belt conveyor 142. This depositing of the dough, however, is done without wrinkling or stretching because of this compensated angular speed. The dough thus lapped and overlapped is transported upwardly by the conveyor belt 126, and moves between the feeding rolls of the second lapper 256, and downwardly therethrough, being deposited in overlapping layers upon the belt conveyor thereof immediately beneath the second lapper 256, as shown at the left-hand side of Figure 3. The dough thus overlapped by the second lapper 256 is transported by the belt conveyor 257 upwardly and horizontally to the gauge rolls 259 and 260, whence it is transported by the belt conveyors 261 and 262 to subsequent machinery.

Modified compensated driving mechanisms for dough lapper

Figure 19:
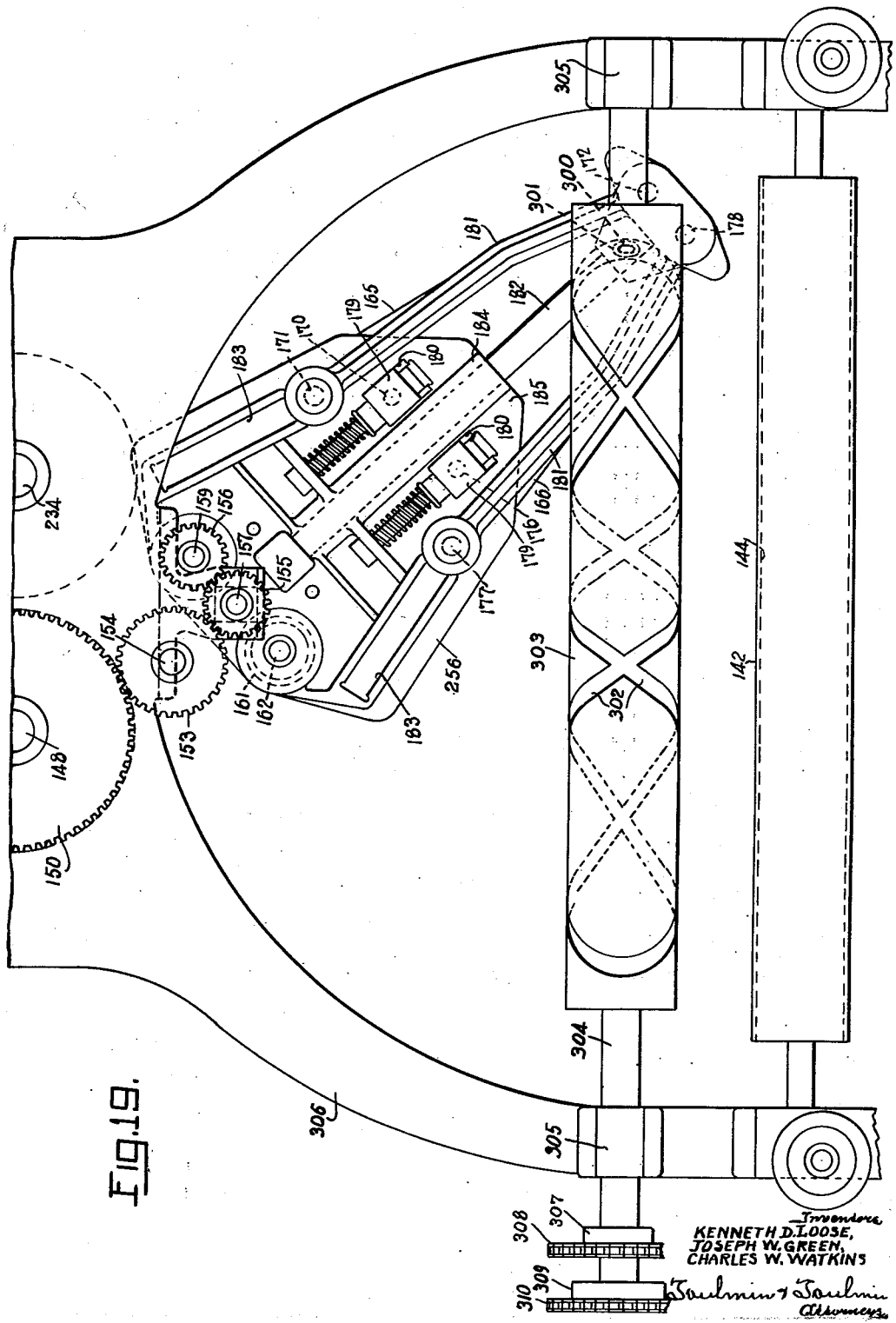
Figure 19 is an enlarged side elevation of another modified form of lapping machine, with a compensated lapper speed.
Figure 20:
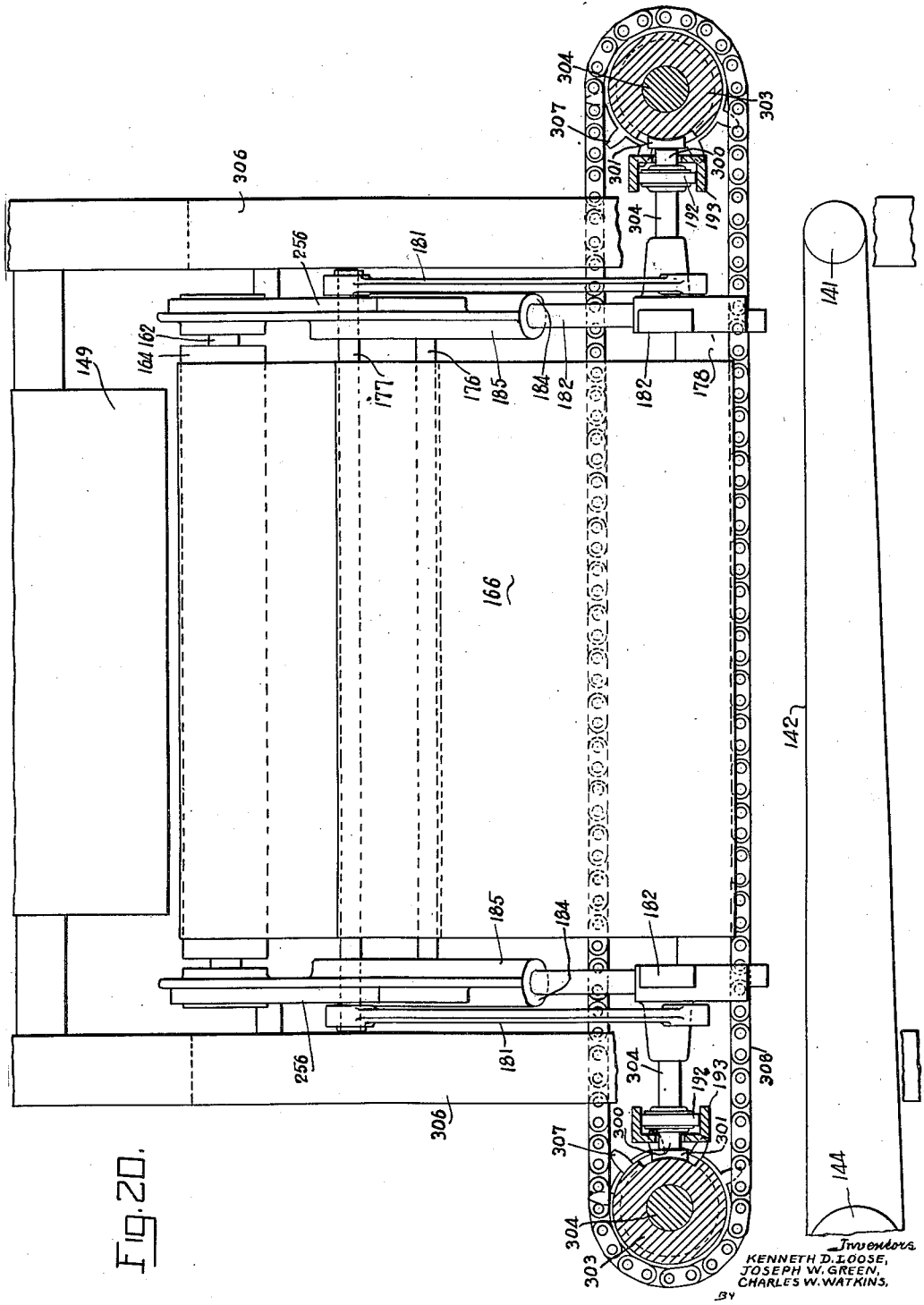
Figure 20 is an end elevation, partly in section, of a portion of the machine shown in Figure 19.

The modified driving mechanism shown in Figures 19 and 20 for the dough lapper replaces the cam drive, previously described. In this modification the lapper itself is of similar construction to that already described, and consequently its parts bear similar reference numerals. The nose portions of the lapper, however, are provided with pins 300 which carry rollers 301 engaging in reversely spiralled grooves 302 in the drums 303. The latter are mounted upon shafts 304 supported in the bearing blocks 305 mounted upon the frame, generally designated 306, and are interconnected by the sprockets 307 and sprocket chain 308. An additional sprocket 309 on one of the shafts is engaged by a sprocket chain 310 to drive the assembly.

The cam grooves 302 upon the drums 303 are arranged of such inclinations at various points along the drums as to give the compensated speeds shown in Figures 8, 10 and 11. In this manner the groove is more sharply inclined at certain portions of the drum than at others so as to give the nose portion of the lapper a compensated speed.

Figure 17:
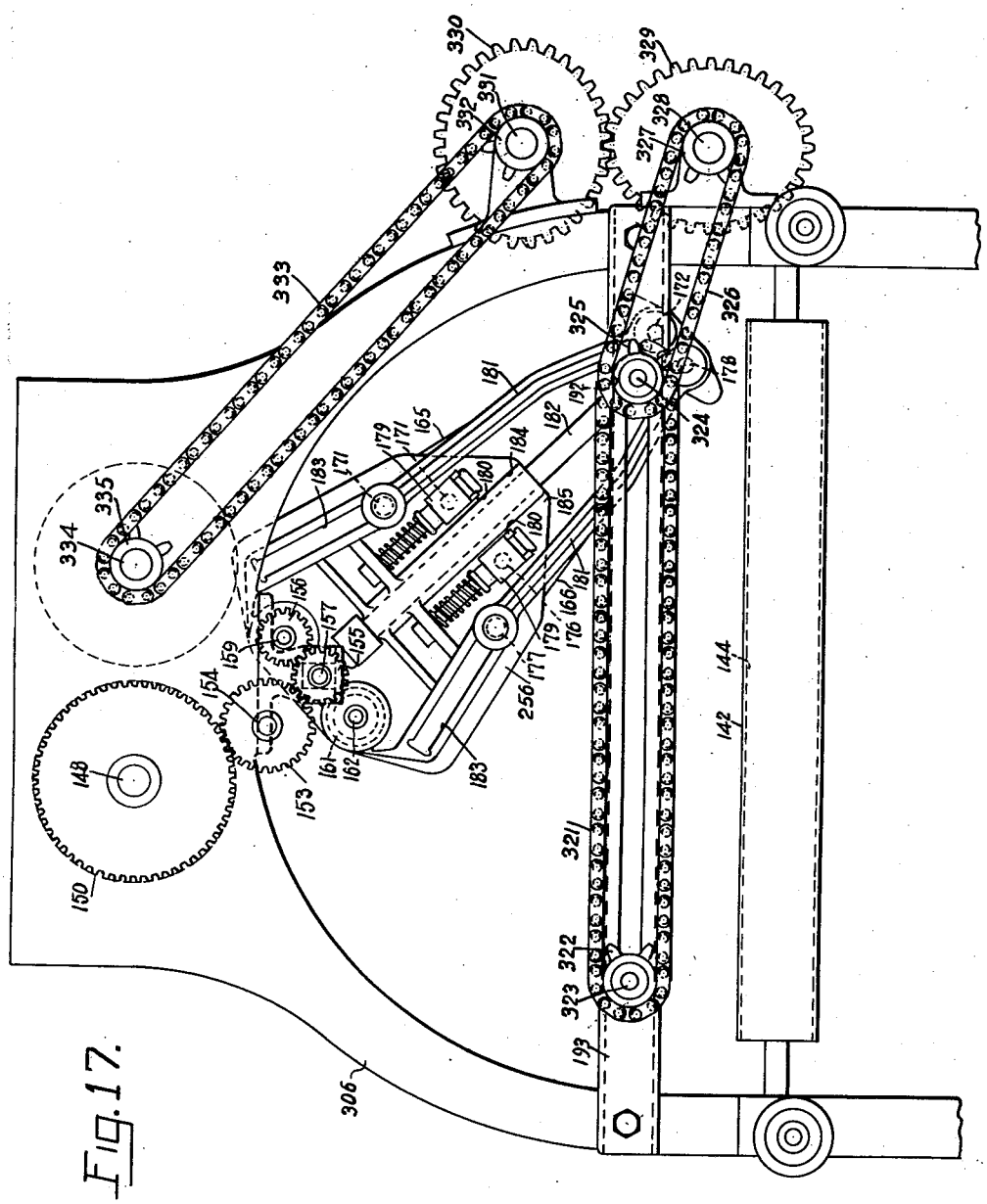
Figure 17 is an enlarged side elevation of a modified dough-lapping machine with a compensated lapper speed.
Figure 18:
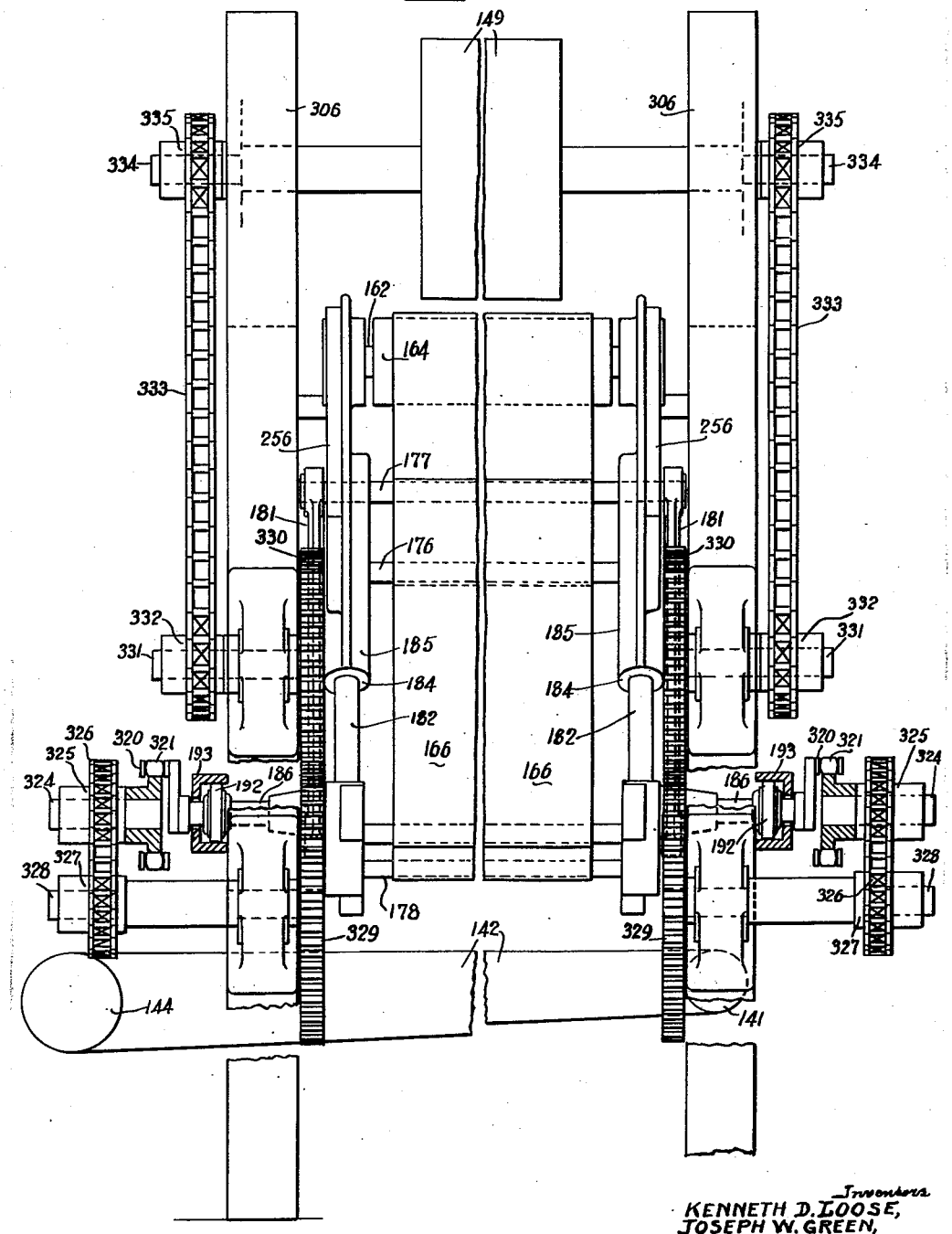
Figure 18 is an end elevation, partly in section, of the machine shown in Figure 17.

The modified driving mechanism shown in Figures 17 and 18 employs a similar lapper to that already described. The nose portion of the lapper, however, is connected by suitable pins 320 to sprocket chains 321 passing around the sprockets 322, mounted upon the shafts 323 and 324. A second sprocket 325 upon the shaft 324 transmits power thereto by means of the sprocket chain 326 from the sprocket 327 upon the shaft 328. The latter is provided with an elliptical gear 329 meshing with an elliptical gear 330 mounted upon the shaft 331, and driven by the sprocket 32 through the sprocket chain 333 from the sprocket 334. The latter is mounted upon the shaft 335, upon which one of the feeding rolls is mounted. Consequently, when the shaft 335 is rotated the elliptical gears 329 and 330 impart a variable speed to the shaft 328 at different portions of their revolution, this being transmitted to the sprocket chain shaft 331, and driven by the sprocket 332 through through the agency of the pins 320 engaging the sprocket chain 321. In this manner the nose portion of the lapper is likewise given a compensated speed.

Thus, by the compensated motion mechanism of the present invention the dough lapper is moved, at the beginning of its half stroke, with a speed greater than simple harmonic motion, and near the end of its half stroke at a speed less than simple harmonic motion. In other words, near the beginning of its half stroke the dough lapper is moved at a speed which is greater than the normal speed of reciprocation imparted by a crank mounted upon a shaft rotating at a constant speed, and near the end of its half stroke at a speed less than this normal reciprocation speed. The mechanisms of the present invention, therefore, apply an accelerated speed near the start of the half stroke and a retarded speed near the end thereof. For the remainder of the stroke, wherein the dough lapper returns to its original position, the lapper initially moves with an accelerated speed, and nears its starting point at a retarded speed. This is clearly shown in Figure 10 for the outward half stroke, and in Figure 11 for the returning half stroke. The greater the intervals between successive letters, in Figures 10 and 11, the higher is the speed at that portion of the stroke. Where the letters become closer together the speed of motion is correspondingly retarded.

It will be understood that we desire to comprehend within our invention such modifications as come within the scope of the claims and the invention.

Having thus fully described our invention, what we claim as new and desire to secure by Letters Patent, is:

1. In a dough-lapping machine, a conveyor, moving means for receiving and depositing a continuous sheet of dough upon the conveyor in over-lapping layers, and means for moving said depositing means at a more accelerated speed than simple harmonic motion near the beginning of its half stroke.

2. In a dough-lapping machine, a conveyor, moving means for receiving and depositing a continuous sheet of dough upon the conveyor in over-lapping layers, and means for moving said depositing means at a more accelerated speed than simple harmonic motion near the beginning of its half stroke and at a more retarded speed than simple harmonic motion near the end of said half stroke.

3. In a dough-lapping machine, a conveyor, moving means for receiving and depositing a continuous sheet of dough upon the conveyor in over-lapping layers, and means for moving said depositing means relatively to said conveyor in a rectilinear path at a more accelerated speed than simple harmonic motion near the beginning of said forward motion.

4. In a dough-lapping machine, a conveyor, moving means for receiving and depositing a continuous sheet of dough upon the conveyor in over-lapping layers, and means for moving said depositing means relatively to said conveyor in a rectilinear path at a more accelerated speed than simple harmonic motion near the beginning of said forward motion and at a more retarded speed than simple harmonic motion near the end of said forward motion.

5. In a dough-lapping machine, a conveyor, moving means for receiving and depositing a continuous sheet of dough upon the conveyor in over-lapping layers, said depositing means moving forward and back across said conveyor, and means for moving said depositing means at a more accelerated speed than simple harmonic motion near the beginning of said forward motion, at a more retarded speed than simple harmonic motion near the end of said forward motion, and at a more accelerated speed than simple harmonic motion near the beginning of said return motion.

6. In a dough-lapping machine, a conveyor, moving means for receiving and depositing a continuous sheet of dough upon the conveyor in over-lapping layers, said depositing means moving forward and back across said conveyor, and means for moving said depositing means at a more accelerated speed than simple harmonic motion near the beginning of said forward motion, at a more retarded speed than simple harmonic motion near the end of said forward motion, at a more accelerated speed than simple harmonic motion near the beginning of said return motion, and at a more retarded speed than simple harmonic motion near the end of said return motion.

7. In a dough-lapping machine, a conveyor, a swinging member arranged to receive and deposit a continuous sheet of dough upon the conveyor in overlapping layers, and means for moving said swinging member at a compensated variable speed relatively to simple harmonic motion during different portions of its stroke whereby to deposit the dough without wrinkling or stretching at different portions of the stroke.

8. In a dough-lapping machine, a conveyor, a swinging member arranged to receive and deposit a continuous sheet of dough upon the conveyor in overlapping layers, said swinging member having two relatively movable portions, one of said portions being arranged to travel in an arcuate path and the other portion being arranged to travel in a rectilinear path, and means for moving the rectilinearly traveling portion of said swinging member at a more accelerated speed than simple harmonic motion near the beginning of its forward stroke.

9. In a dough-lapping machine, a conveyor, a swinging member arranged to receive and deposit a continuous sheet of dough upon the conveyor in overlapping layers, said swinging member having two relatively movable portions, one of said portions being arranged to travel in an arcuate path and the other portion being arranged to travel in a rectilinear path, and means for moving the rectilinearly traveling portion of said swinging member at a more accelerated speed than simple harmonic motion near the beginning of its forward stroke and at a more retarded speed than simple harmonic motion near the end of its forward stroke.

10. In a dough-lapping machine, a conveyor, a swinging member arranged to receive and deposit a continuous sheet of dough upon the conveyor in overlapping layers, and means for moving said swinging member at a more accelerated speed than simple harmonic motion near the beginnings of the forward and return portions of its stroke.

11. In a dough-lapping machine, a conveyor, a swinging member arranged to receive and deposit a continuous sheet of dough upon the conveyor in overlapping layers, and means for moving said swinging member at a more accelerated speed than simple harmonic motion near the beginnings of the forward and return portions of its stroke and at a more retarded speed than simple harmonic motion near the ends of the forward and return portions of its stroke.

12. In a dough-lapping machine, a conveyor, moving means for receiving and depositing a continuous sheet of dough upon the conveyor in overlapping layers, and a cam mechanism for moving said depositing means at a more accelerated speed than simple harmonic motion in one direction of its stroke.

13. In a dough-lapping machine, a conveyor, moving means for receiving and depositing a continuous sheet of dough upon the conveyor in overlapping layers, and a cam mechanism for moving said depositing means at a more accelerated speed than simple harmonic motion near the start of a half stroke thereof and at a more retarded speed than simple harmonic motion near the end of a half stroke thereof.

14. In a dough-lapping machine, a conveyor, moving means for receiving and depositing a continuous sheet of dough upon the conveyor in overlapping layers, and ellipsoidal gear mechanism for moving said depositing means at a more accelerated speed than simple harmonic motion near the start of a half stroke thereof.

15. In a dough-lapping machine, a conveyor, moving means for receiving and depositing a continuous sheet of dough upon the conveyor in overlapping layers, and ellipsoidal gear mechanism for moving said depositing means at a more accelerated speed than simple harmonic motion near the start of a half stroke thereof and at a more retarded speed than simple harmonic motion near the end of a half stroke thereof.

16. In a dough-lapping machine, a conveyor, moving means for receiving and depositing a continuous sheet of dough upon the conveyor in overlapping layers, and an actuating member with a spiral portion associated therewith for moving said depositing means at a more accelerated speed than simple harmonic motion near the start of a half stroke thereof.

17. In a dough-lapping machine, a conveyor, moving means for receiving and depositing a continuous sheet of dough upon the conveyor in overlapping layers, and an actuating member with a spiral portion associated therewith for moving said depositing means at a more accelerated speed than simple harmonic motion near the start of a half stroke thereof and at a more retarded speed than simple harmonic motion near the end of a half stroke thereof.

KENNETH D. LOOSE.
CHARLES WAYNE WATKINS.
JOSEPH W. GREEN.